Nov. 26, 1968   R. F. WADDELL   3,413,022
SELF-LOCKING THREADED RING ASSEMBLY
Filed Nov. 14, 1966

INVENTOR.
ROBERT F. WADDELL

BY Woodard, Weikart, Emhardt & Naughton
Attorneys

4 Claims. (Cl. 287—52.07)

3,413,022
SELF-LOCKING THREADED RING ASSEMBLY
Robert F. Waddell, Indianapolis, Ind., assignor to Standard Locknut & Lockwasher, Inc., Indianapolis, Ind., a corporation of Indiana
Filed Nov. 14, 1966, Ser. No. 594,281
4 Claims. (Cl. 287—52.07)

This invention relates generally to locking means for mounting or fixing elements on shafts and in particular to a threaded ring assembly which can be locked upon a shaft to mount elements such as bearings or pulleys without the necessity of cutting or forming threads on the shaft.

In mounting bearings, pulleys or similar elements on shafts it is customary to form the shaft with a shoulder against which the element may abut and to thread the shaft adjacent the shoulder so that some form of locking nut can be turned on the shaft to lock the element to be mounted rigidly against the shoulder. Threading of the shaft requires, of course, threading machinery and an operation putting the usual key-slot in the threaded area. Careful inspection of the shaft threads is necessary at the end of the shaft production operation. Should it be necessary to interchange or replace, in the field, the bearing or other member locked on the shaft, there is the danger that the threads on the shaft may be stripped or damaged when the locknut is removed and that expensive and time-consuming reworking of the shaft will be necessary.

It is the primary object of the present invention to provide a self-locking assembly for fixing elements on a shaft which does not require threading or key-slotting of the shaft.

A further object of the present invention is to provide a self-locking assembly of the type referred to which can be removed from the shaft without danger to the shaft itself and which has improved load bearing capability because of the elimination of thread tolerance at certain critical areas of the component parts.

These and other objects will become apparent as the description proceeds with reference to the accompanying drawings in which.

Figure 1:
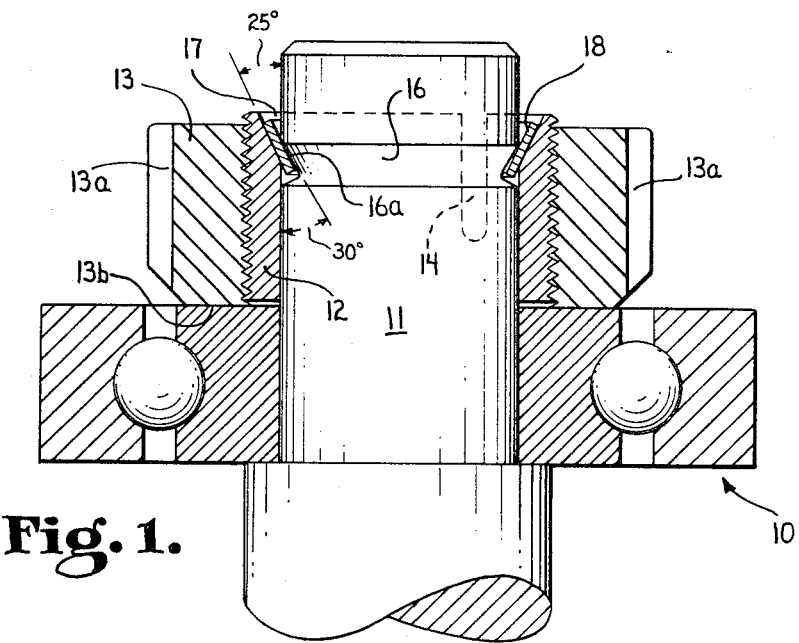
FIG. 1 is an enlarged, sectional view of the locking assembly of the present invention in place on a shaft.
Figure 2:
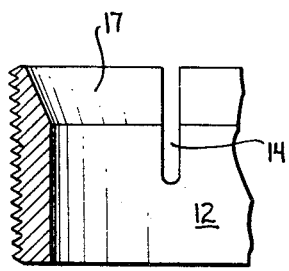
FIG. 2 is a fragmentary, sectional view of the threaded sleeve component of the assembly.

Referring initially to FIG. 1, the assembly of the present invention is seen to be utilized for clamping an element such as a bearing, indicated generally at 10, against a shouldered portion of the shaft 11. The assembly includes an exteriorly threaded sleeve 12 which freely encircles the shaft and a locknut 13 which is threaded over the sleeve. The locknut may have any suitable exterior circumferential configuration and may be provided with spanner wrench slots 13a or any other suitable means permitting it to be forcefully threaded over the sleeve 12. The inner end face 13b of the nut is adapted to engage an adjacent surface of the bearing element 10. The threaded sleeve 12 fits freely but snugly upon the extending, reduced-diameter portion of the shaft 11 and in its outer end area, as may be seen in FIGS. 1 and 2, is provided with axially extending and diametrically opposite slots 14 which permit radial expansion of this end portion of the sleeve 12 as will subsequently be described.

The shaft 11 has formed therein a circumferential groove 16 having an extended, inclined face 16a, the angle of inclination of the face 16a with the axis of the shaft being, as indicated in FIG. 1, approximately 30°. The adjacent end of the sleeve 12 is formed to provide an annular internal surface 17 which is inclined with relation to the shaft axis and is disposed generally opposite to and spaced from the inclined groove face 16a. The angle of inclination of the surface 17 is less than the angle of inclination of the groove face 16a and, as indicated in FIG. 1, may be approximately 25°.

Figure 3:
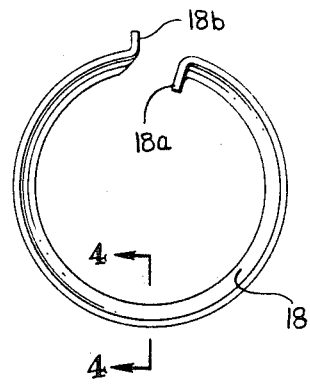
FIG. 3 is a top plan view of the thrust diverter ring component of the assembly.
Figure 5:
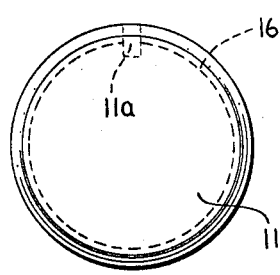
FIG. 5 is an end view of the shaft shown in FIG. 1.
Figure 4:
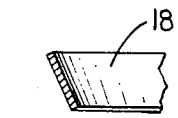
FIG. 4 is a fragmentary sectional view of the thrust diverter ring taken generally along the line 4—4 of FIG. 3.

Accommodated within the space between the groove face 16a and the surface 17 is a thrust diverter ring 18 having the cross sectional configuration and form indicated in FIGS. 3 and 4. The ring is formed of steel and is discontinuous, as indicated in FIG. 3. The ring 18 may be held against rotation or anchored by any suitable means, as here illustrated such means taking the form of oppositely bent tip portions 18a and 18b of the ring (FIG. 3). The discontinuity of the ring permits it to spring open somewhat so that it may be slipped on the shaft 11 and the tip 18b of the ring may be placed in one of the slots 14 in the threaded sleeve 12. The opposite tip 18a is seated, when the ring is in place, in an aperture 11a (FIG. 5) which extends radially into the shaft 11. It will be understood that the resiliency of the ring permits it to be snapped in place and removed from the shaft 11.

In operation, the bearing element 10 or any other element to be mounted on the shaft 11 is placed on the shaft in position, the sleeve 12 is placed on the shaft, the ring 18 snapped in place as shown in FIG. 1 and finally the nut 13 is turned down on the threaded sleeve 12. As the nut surface 13b is initially tightened against the bearing element 10, a reacting upward force will be exerted on the sleeve 12 causing it to move upwardly (as viewed in FIG. 1), and the inclination of surface 17 and its contact with the outer face of the ring 18 will cause the outer end portion of the sleeve 12 to expand radially outward (the slots 14 in the sleeve permitting such radial expansion) to take up the thread tolerance existing between the sleeve and the nut. This take-up of thread tolerance results in greatly improved load carrying capacity since the larger area contact of the engaging threads reduces the unit stress on the thread for a given force applied in a thread-stripping direction. Ordinarily, only the first three, leading threads carry substantially the entire load; in the structure described, however, because of spreading of the end of sleeve 12 to take up the thread tolerance, the load is distributed over all the threads. Further, the last, protruding thread or threads on sleeve 12, after the nut 13 has been tightened down, will have a pitch diameter greater than the pitch diameter of the adjacent threads on the nut 13. The resulting interference adds to the load carrying ability of the assembly because some of the shear forces are contained by the hoop strength of the nut.

Further tightening of the nut against the bearing element will apply further increased upward forces against the sleeve 12 and, since radial expansion of the outer end of the sleeve is now blocked, the thrust diverter ring 18 will tend to be forced downwardly (as viewed in FIG. 1) further into the groove 16. This redirects the thrust load from a direction parallel to the shaft axis to a direction toward or generally transverse to the shaft axis, and is brought about by the slightly tapered configuration of the space occupied by the ring 18, the taper occurring because of the difference in inclination of the groove face 16a and the surface 17 of the sleeve. This tendency to hold the thrust diverter ring 18 in the groove 16 as the nut 13 is tightened serves to apply strong radial compressive force to the shaft in a direction generally transverse to its axis and this gripping force firmly locks the sleeve in place on the shaft. The sleeve can not be removed without removal of the nut 13. If removal is necessary for replacement of the element locked on the shaft, the nut may be backed off the sleeve 12, the ring 18 sprung from its seat and the sleeve 12 may be removed from the shaft to permit access to the element 10.

From the foregong it will be evident that the assembly embodying the present invention permits rigid mounting of elements on a shaft without threading the shaft itself. The element can be removed from the shaft without risk of damage to the shaft itself and without necessitating reworking of the shaft as is the case where actual threading of the shaft is required. The freedom of removal of the assembly from the shaft has particular utility where there is a possibility of shift of thread standard as for example in shifting from British to U.S. thread standards and vice versa. When such shift is to take place a substitution of a sleeve carrying the desired thread configuration is sufficient and the shaft need not be reworked. While one form of means for anchoring the ring 18 is disclosed, it will be understood that other means, such as placing a transverse element on the ring for extension into the slot 14 and the shaft aperture 11a might be utilized in place of the oppositely deformed tips of the ring here illustrated.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:
1. An assembly for locking an element rigidly to a shaft comprising an exteriorly threaded sleeve adapted to freely encircle the shaft and a nut adapted to be threaded on said sleeve and to engage at its inner end a surface of the element supported on the staft, said sleeve having at least one axially extending slot at the end of the sleeve remote from said engaging surface of the nut, said shaft having a circumferential groove with a face inclined with relation to the shaft axis, said sleeve having at its slotted end an annular internal surface which is inclined to the shaft axis and is disposed generally opposite to and spaced from said inclined groove face, the angle of inclination of said groove face with the shaft axis being greater than the angle of inclination of said annular sleeve surface with the shaft axis, and a thrust diverter ring accommodated within the space between and in engagement with said annular sleeve surface and said groove face, whereby upon initial tightening of said nut against said element said slotted end of said sleeve is expanded to take up the thread tolerance between the sleeve and the nut, and subsequent tightening of said nut, because of the difference in angle of inclination of said shaft groove face and said annular sleeve surface, redirects forces from a direction parallel to the shaft axis to a direction generally transverse to the shaft axis to lock said nut axially upon the shaft.

2. An assembly as claimed in claim 1 in which said sleeve has two diametrically opposite axially extending slots at the end of the sleeve remote from said engaging surface of the nut.

3. An assembly as claimed in claim 1 in which said thrust diverter ring is discontinuous to permit it to be slipped over said shaft and to snap into said shaft groove and carries means anchoring said ring against rotation within said shaft groove.

4. An assembly as claimed in claim 1 in which said angle of inclination of the groove face is approximately thirty degrees and said angle of inclination of the annular sleeve surface is approximately twenty-five degrees.

References Cited
UNITED STATES PATENTS 2,104,108  1/1938  Webb.
2,615,735  10/1952  Heimann et al. _____ 287—53

FOREIGN PATENTS 1,124,542  7/1956  France.

CARL W. TOMLIN, *Primary Examiner.*

ANDREW KUNDRAT, *Assistant Examiner.*